United States Patent [19]

Takahashi

[11] Patent Number: 5,208,623
[45] Date of Patent: May 4, 1993

[54] CAMERA INCORPORATING A ZOOM LENS

[75] Inventor: Hiroshi Takahashi, Hachioji, Japan

[73] Assignee: Konica Corporation, Tokyo, Japan

[21] Appl. No.: 625,044

[22] Filed: Dec. 10, 1990

[30] Foreign Application Priority Data

Dec. 12, 1989 [JP] Japan .................. 1-322405

[51] Int. Cl.⁵ .................................................. G03B 3/10
[52] U.S. Cl. .................................................. 354/195.1
[58] Field of Search ..................................... 354/195.1

[56] References Cited

U.S. PATENT DOCUMENTS 4,936,664  6/1990  Haraguchi et al. ............... 354/195.1
4,962,399 10/1990  Numako et al. ................. 354/195.1

Primary Examiner—Michael L. Gellner
Attorney, Agent, or Firm—Jordan B. Bierman

[57] ABSTRACT

Camera incorporating a zoom lens which includes an operating member for zooming, a means for driving the zoom lens, and a control for controlling the drive means. The control means controls the drive means in a first driving mode in which the zoom lens is moved in a predetermined direction upon operation of the operating member and is also moved in the same direction upon further operation of the operating member. The moving direction is reversed upon reaching either the telescopic end of the travel or at the wide-angle end of the travel.

Alternatively, a second driving mode is provided wherein the zoom lens is moved in a predetermined direction upon operation of the operating member, reverses direction of movement upon further operation of the operating member, and reverses a moving direction upon reaching either the telescopic end of the travel or at the wide angle end of the travel.

5 Claims, 8 Drawing Sheets

CAMERA INCORPORATING A ZOOM LENS

BACKGROUND OF THE INVENTION

1. Field of the Invention

The present invention relates to a camera incorporating a zoom lens.

2. Description of the Prior Art

There are a wide variety of cameras each incorporating a motor-driven zoom lens commercially available today. Any of these conventional cameras is cameras provided with an operating member for moving the zoom lens in the direction of TELE mode or WIDE mode as required.

Such of operating members are of following types that is a pair of operating buttons each being provided for activating either the TELE mode or the WIDE mode: A seesaw button switch to activate either the TELE mode or the WIDE mode when depressed either side, and a disc-type switch which activates either the TELE mode or the WIDE mode by turning a rotatable disc either to the right or to the left.

Any of these conventional mode shifting switches is manually operated by a user. Therefore, he needs to move his finger to operate the mode shifting switch corresponding to the desired mode before driving the zoom lens in the inverse direction from WIDE to TELE or vice versa. This in turn affects holding stability of the camera due to manual oscillation to adversely affect framing work. Furthermore, since the user manually searches the mode-shifting switch by moving his finger, he may not be able to concentrate his attention to keep on shooting the targets. Since any conventional camera incorporating a zoom lens necessarily requires a pair of switches for shifting TELE and WIDE and therefore space is needed for these mode-shifting switches.

SUMMARY OF THE INVENTION

It is therefore an object of the present invention to provide a camera incorporating a zoom lens whose zooming operation is improved. For this purpose, the present invention provides a camera incorporating a zoom lens which includes an operating member for zooming purpose; a drive means for driving said zoom lens; and a control means for controlling said drive means; wherein said control means controls said drive means in the first driving mode in which said zoom lens is moved in a predetermined direction upon operation of said operating member and is further moved in the same direction upon further operation of said operating member; and inverts moving direction upon arrival either at TELE terminal or at WIDE terminal while moving or in the second driving mode in switch said zoom lens is moved in a predetermined direction upon operation of said operating member; and inverts direction of movement upon further operation of said operating member; and inverts moving direction upon arrival either at TELE terminal or at WIDE terminal while moving.

DETAILED DESCRIPTION OF PREFERRED EMBODIMENTS

Figure 1:
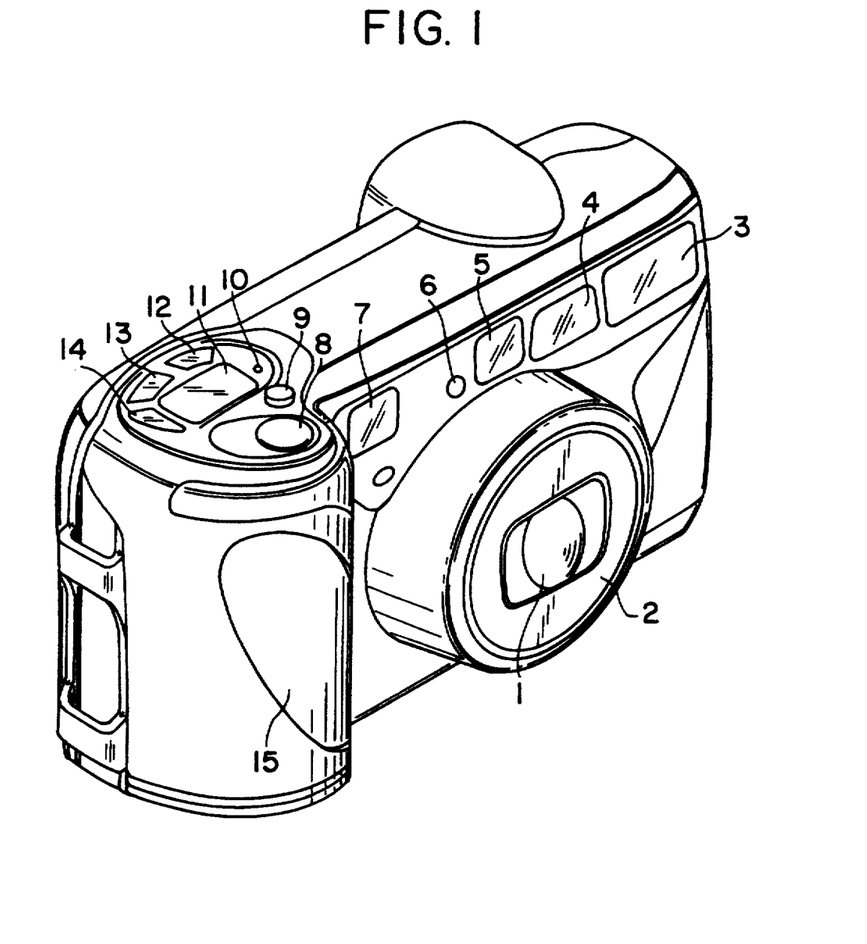
FIG. 1 is an overall perspective view of the camera incorporating a zoom lens according to an embodiment of the invention.

Referring now to FIG. 1 there is shown a perspective view of a camera incorporating a zoom lens according to an embodiment of the invention.

Reference numeral 1 designates a zoom lens incorporating double-group zoom systems capable of varying focal distance between the shortest focal distance (WIDE terminal) and the longest focal distance (TELE terminal). Reference numeral 2 designates a mirror cylinder. The zoom lens 1 is driven by a zoom motor 32 to be described later on, where the zoom lens 1 is extruded from the retracted position to the WIDE terminal when the power switched on, and then it is continuously driven from the WIDE terminal to the TELE terminal in response to the activated zooming function. When the power is switched off, the zoom lens 1 returns to the retracted position.

Reference numeral 3 designates a flash light. The reference numeral 4 designates a real-image zoom viewfinder window. Reference numeral 5 designates an AF light-emitter, 6 an AE light receiving unit, and 7 designates an AF light receiving unit, respectively. Reference numeral 8 designates a shutter release button, 9 a zoom button for activating zooming function, and 10 designates a button for rewinding a roll of film on the halfway of use. Reference numeral 11 designates an LCD (liquid crystal display) panel displaying number of shots, remaining power level of a battery, and other photography related data. Reference numeral 12 designates a mode switching button for selecting the desired strobe light mode and self timer mode. Reference numeral 13 designates a snap mode button for activating the snap mode described later on. Reference numeral 14 designates the power switch button for turning the power ON and OFF, and 15 designates the grip, respectively.

Figure 2:
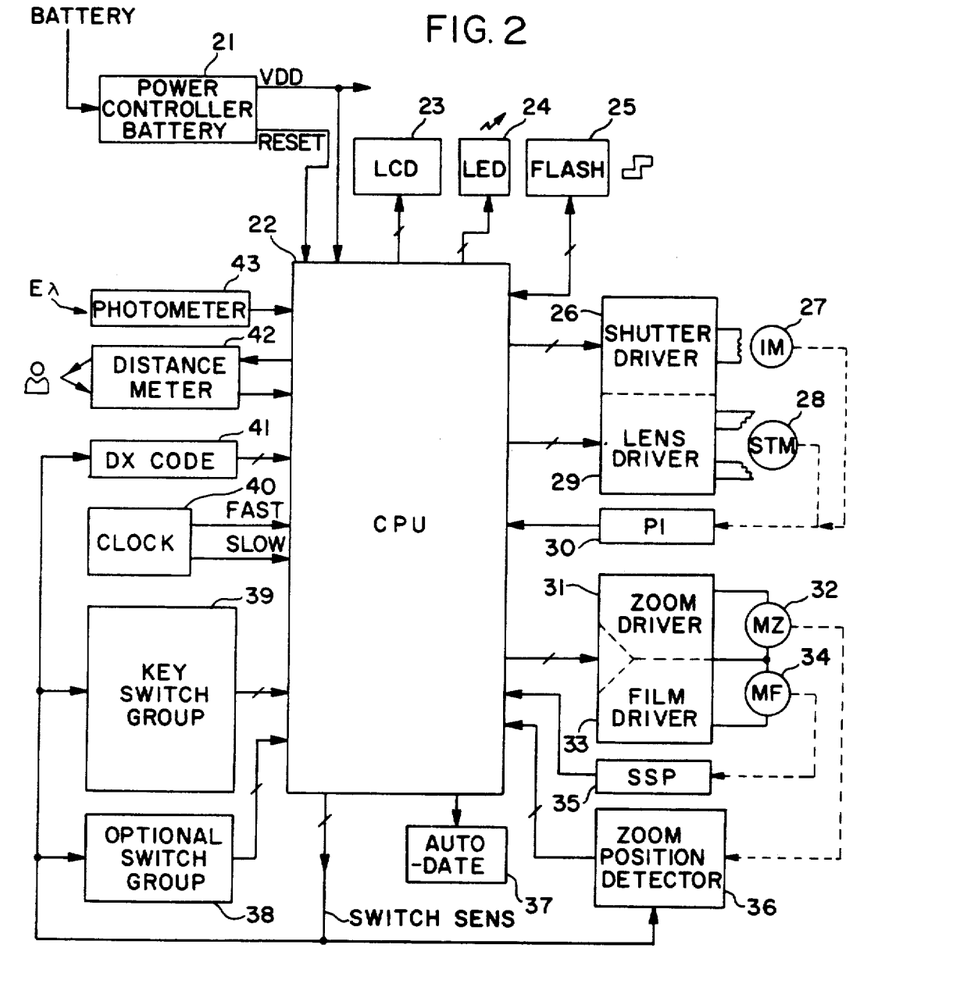
FIG. 2 is a schematic block diagram of the circuits of the camera shown in FIG. 1.

Referring now to FIG. 2, structure of functional circuits built in the camera embodied by the invention is described below. The reference numeral shown in FIG. 2 designates a power controller which supplies the DC power to each circuit. The reference numeral 22 designates a CPU (central processing unit) which solely controls whole the photographic routines of the camera. The reference numeral 2 designates an LCD, 24 an LED (light emitting diode) which warns the user of abnormal condition of use in the view-finder like too short distance from the target for example. The reference numeral 25 designates a strobe flash light. The reference numeral 26 designates a shutter driver unit which drives a shutter motor 27. The reference numeral 28 designates a focussing motor which drives the front-group focussing lenses to focus on the target. The reference numeral 29 designates a lens driver which drives the focussing motor 28. The reference numeral 30 designates a photo-interrupter which detects the position of the shutter blades and the focussing lenses. The reference numeral 31 designates a zoom driver unit which drives the zoom motor 32 executing zooming operation. The reference numeral 33 designates a film driving unit which drives a film-rewinding motor 34. Reference numeral 35 designates a transferred-film number detecting switch which detects the number of the shot-completed frames of a roll of film in the camera. Reference numeral 36 designates a zoom-lens position detector. Reference numeral 37 designates a date printer which prints data and time on the shot-completed film frames. Reference numeral 38 designates a group of optional switches available for performing adjustments and tests.

Reference numeral 39 designates a group of key switches comprising the following; an S1 switch which turns itself ON when the shutter release button 8 is depressed by one step, an S2 switch which turns itself ON when the shutter release button 8 is depressed furthermore by one step, a zoom switch which is activated when the zoom button 9 is depressed, a film rewinding switch which is activated when the halfway-film rewinding button 10 is depressed, a mode switch which is activated when the mode switching button 12 is depressed, a snap switch which is activated when the snap button 13 is depressed, and the main switch which is activated when the power-supply button 14 is depressed, respectively.

Reference numeral 40 designates an oscillation circuit which supplies two kinds of clock pulses containing different frequencies to the CPU 22. The reference numeral 41 designates a DX code detection circuit which reads the DX code provided on a patrone of each frame of the film. Reference numeral 42 designates a range meter which measures the distance between the light-receiving element and the shooting target. The range meter 42 is composed of a light-emitting element which irradiates infrared rays from an infrared LED against the target and a alight-receiving element which detects the distance between the incident light position and the target by causing a light-receiving unit like PSD to receive light reflected from the target. The reference numeral 43 designates photometer which measures the luminance of the target using CdS or the like.

Figure 3:
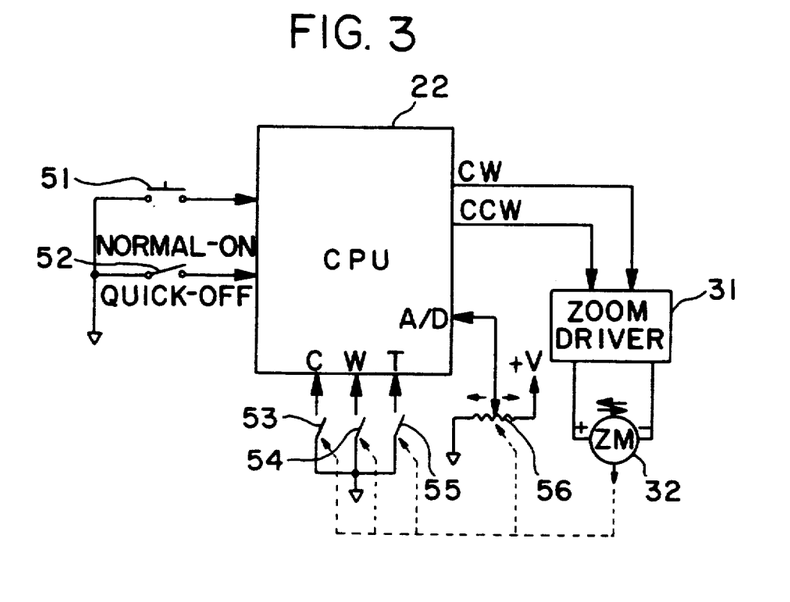
FIGS. 3 and 4 respectively designate components related to the zooming operation.

FIG. 3 designates a block diagram of those circuits related to the zooming operation. Reference numeral 51 designates a zoom switch which is activated when the zoom button 9 is depressed, whereas 52 designates a mode select switch which selects either of the normal and quick zooming modes. Either the normal zooming mode or the quick zooming mode can optionally be selected merely by turning the zoom mode select switch 52 ON or OFF. These zooming modes are described below.

(1) Normal zooming mode

When the user turns the zoom switch 51 ON while holding the zoom mode select switch ON, the zoom lens is driven in the upper direction, i.e., in the direction of the TELE mode. When the zoom lens is fully driven to the TELE terminal, then the zoom lens is driven in the lower direction, in other words, in the direction of the WIDE mode. As soon as the zoom lens arrives at the WIDE terminal, the zoom lens is again driven in the upper direction. When the zoom switch 51 is turned OFF, then the zoom lens cases to perform the above reciprocation when the zoom switch 51 is turned OFF. When the zoom switch 51 is again turned ON, the zoom switch 51 is driven in the same direction as that of the last movement, and then resumes those performances mentioned above. In other words, whenever the zoom switch 51 is turned ON, the zoom lens is driven in one direction, and whenever it arrives at either the TELE terminal or at the WIDE terminal, the direction of the movement of the zoom lens is inverted. This is called the "first drive mode".

(2) Quick zooming mode

When the zoom switch 51 is turned ON by holding the zoom mode select switch 52 OFF, the zoom lens is driven in either direction stored in a memory of the CPU 22. When the zoom switch 51 is once turned OFF and then turned ON, the zoom lens 51 is driven in the inverse direction. In other words, whenever the zoom switch is turns ON and OFF, the direction of the movement of the zoom lens 52 alternately inverts in the TELE direction and in the WIDE direction. As was done for the normal zooming mode, the direction of the movement of the zoom lens 51 is shifted to the opposite direction at the TELE terminal and the WIDE terminal. This is called "the second drive mode".

Reference numeral 53 shown in FIG. 3 designates a close switch which detects that the zoom lens 51 is at the retracted position. Reference numeral 54 designates a WIDE switch which detects that the zoom lens 51 is at the TELE terminal. Reference numeral 56 designates a TELE switch which detects that the zoom lens 51 is at the TELE terminal. Reference numeral 56 designates a potentiometer which detects the actual position of the zoom lens 51 between the WIDE terminal and the TELE terminal.

Figure 4:
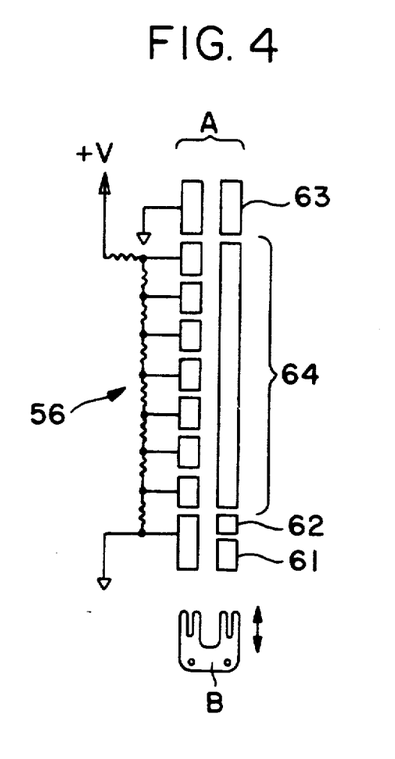

FIG. 4 designates the structure of those functional switches described above. When rotating a cam cylinder (not shown), those front group and rear group lenses composing the zoom lens 51 are moved forward by the predetermined amount. Accordingly, the position of the zoom lens 51 can be detected by identifying the position at which the cam cylinder rotates. Concretely, as shown in FIG. 4, two files of conductive pattern A are provided on the external periphery of the cam cylinder (the structure is shown by way of expansion in FIG. 4). On the other hand, a movable connector B connecting both files of the conductive pattern A is secured to the camera body. The position of the movable connector B on the pattern A varies relative to the rotation of the cam cylinder, and thus, the position of the zoom lens can be detected by detecting the actual position of the movable connector B. Pattern 61 shown in FIG. 4 composes the close switch 53. Pattern 62 composes the WIDE switch 54, and pattern 63 composes the TELE switch 55, respectively. An the switches 53 through 55 are connected to the CPU 22. A certain voltage corresponding to the actual position of the movable connector B appears at pattern 64 which is also connected to the CPU 22.

Figure 5A:
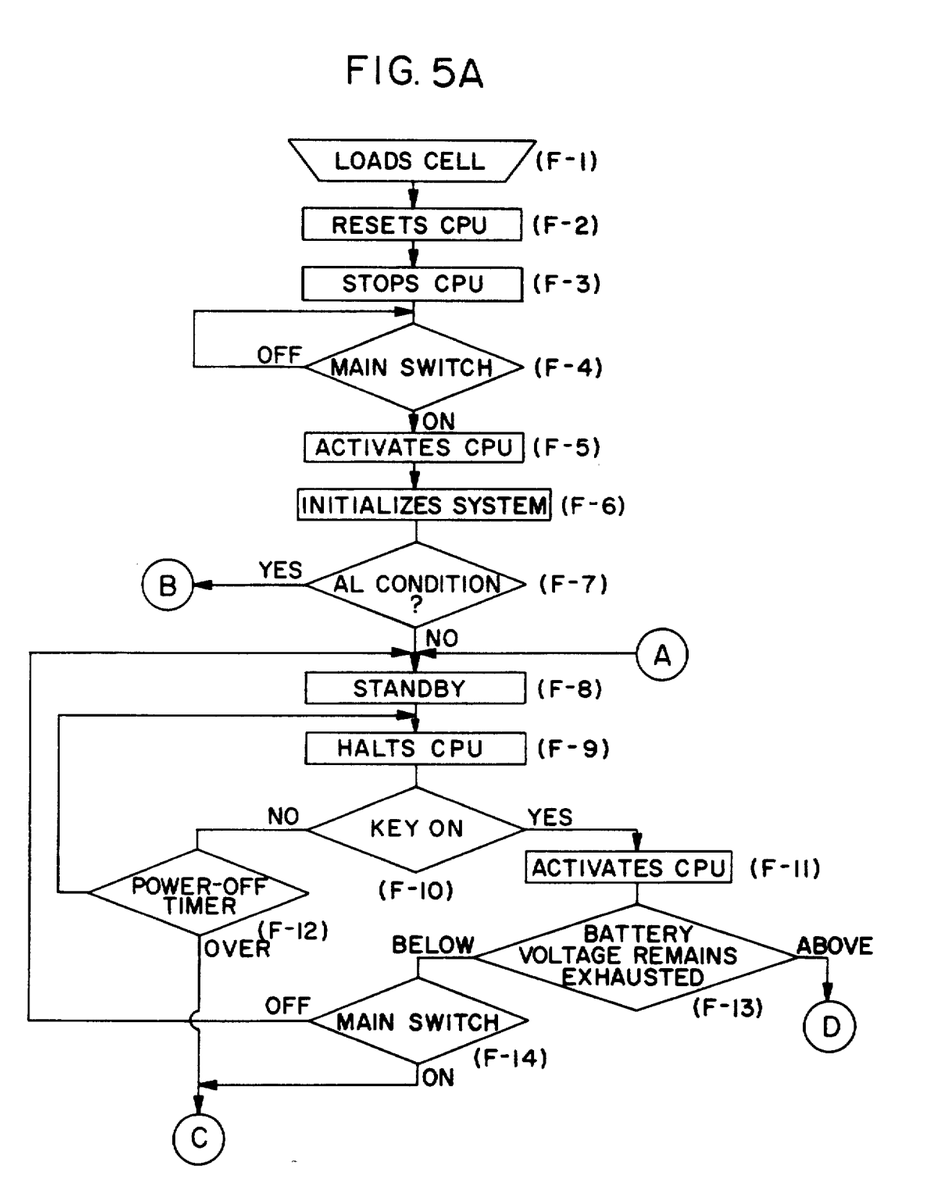
FIGS. 5 and 6 respectively designate flowcharts explanatory of the zooming operations embodied by the invention.
Figure 5B:
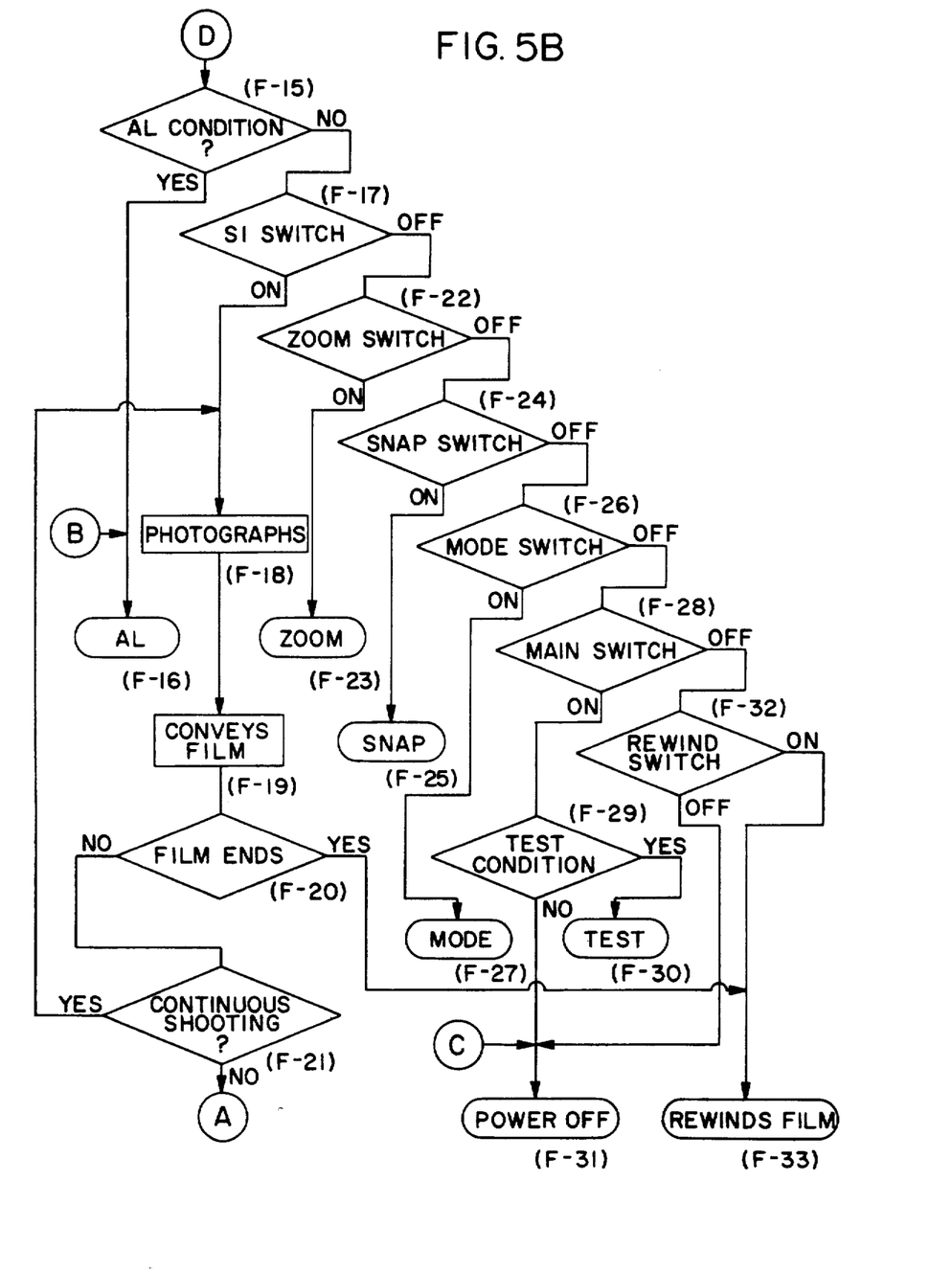
Figure 6A:
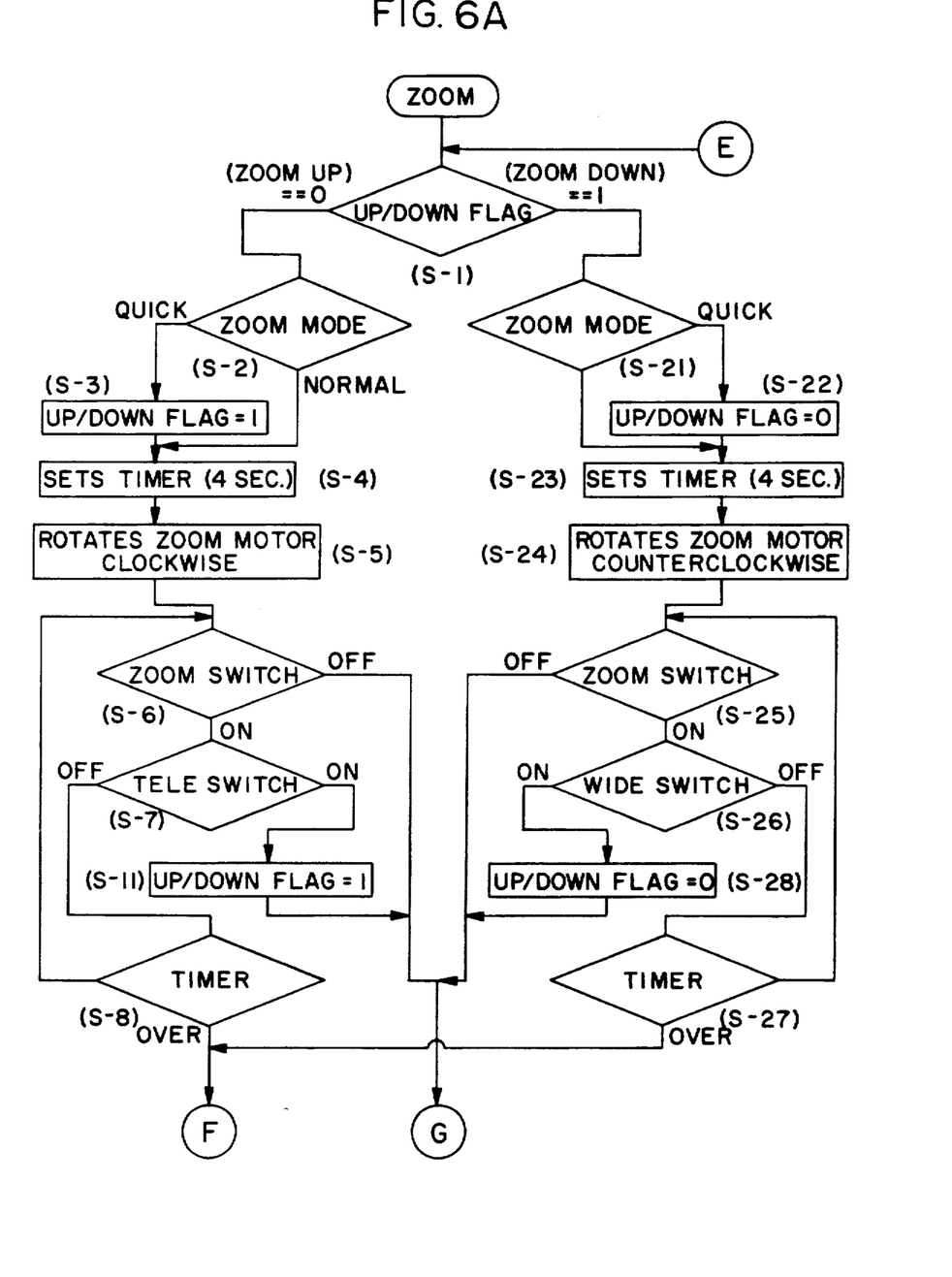
Figure 6B:
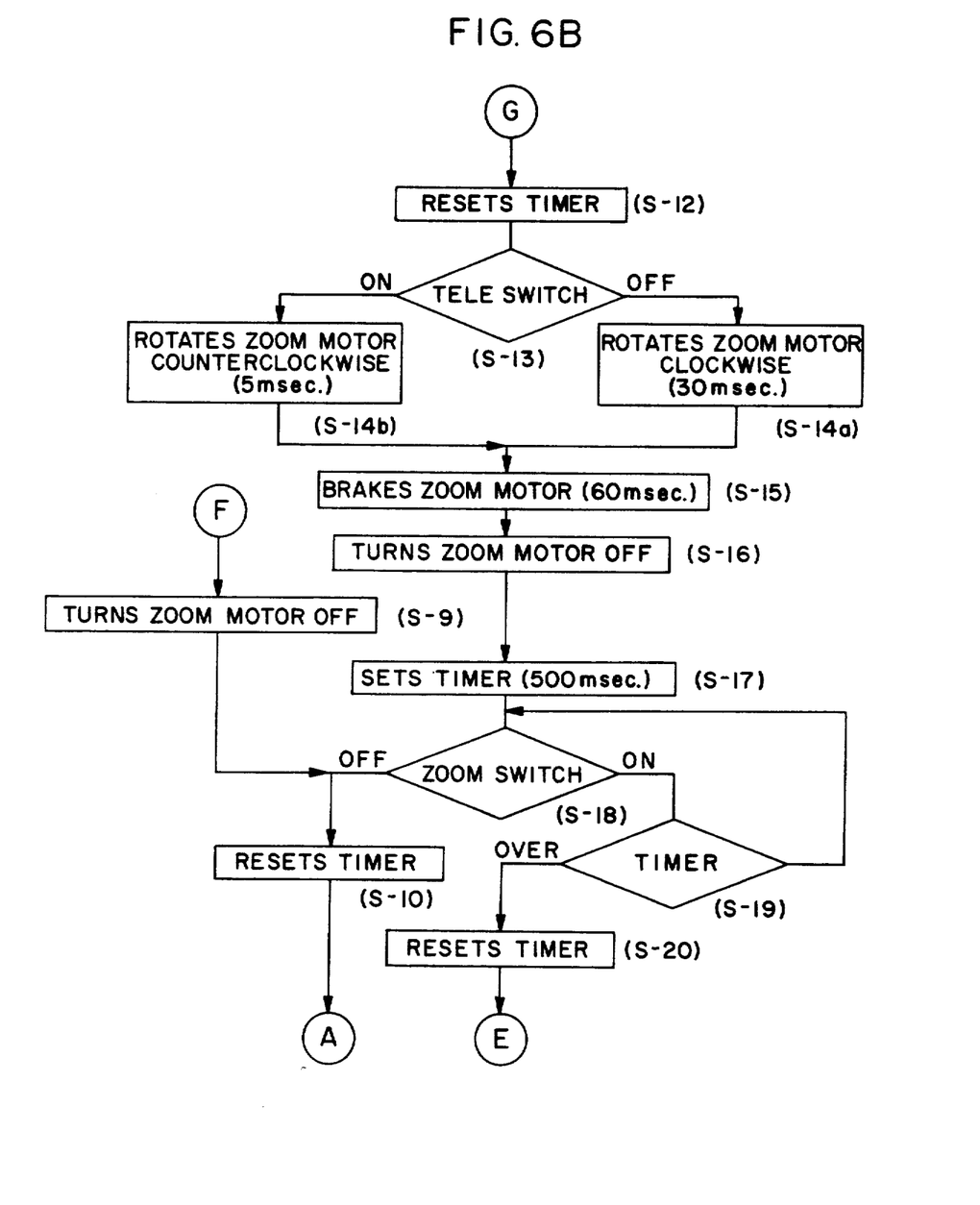

Referring now to the flowcharts shown in FIGS. 5 and 6, functional operations of the camera incorporating a zoom lens according to an embodiment of the invention are described below. FIG. 5 presents the main routine of photographic sequence, whereas FIG. 6 presents the zoom sequence which is substantially the subroutine of the photography.

Referring now to FIG. 5, first, the user loads a cell in the camera in the initial step F-1. This resets the CPU 22 in the following step F-2. Next, step F-3 is entered, in which the main oscillator enters into inoperative condition to minimize consumption of current. When the user turns the main switch ON in the next step F-4, the CPU 22 is activated in the next step F-5. Then, step F-6 is entered, in which the CPU 22 initializes all the functional modes of the camera mechanism like the initialization of the lens position for example. If the user activates the AUTO-loading mode, then step F-16 is entered to execute auto-loading mode. If the AUTO-loading mode were not activated, then the CPU 22 stands by itself in step F-8, and then the camera mechanism enters into "halt" condition in the next step F-9. Those steps F-1 through F-9 are respectively executed once until the cell is actually loaded in the camera. After loading the cell in the camera, functional operations are executed from step F-8 on.

When step F-10 is entered, the CPU 22 checks the conditions of those switches of the key switch group 39. If any of these switches were activated, then step F-11 is entered to activate the operation of the CPU 22. If all the switches remain OFF, then step F-12 is entered, in which the CPU 22 checks the passage of the power-off timer. If the predetermined period of time (like an hour for example) were not yet past, then the CPU 22 remains in the "halt" condition in step 9. After passing the predetermined period of time, step F-31 is entered to turn the power OFF to fully stop functional operation of the CPU 22.

While step F-10 is underway, if any of those switches of the key switch group were activated, then step F-13 is entered, in which the CPU 22 checks the level of the cell voltage. If the cell voltage were below the predetermined level, then the CPU 22 checks the state of the main switch in step F-14. If the main switch were ON, then step F-31 is entered to turn the power OFF. If the main switch were OFF, then the functional mode returns to step 8. If the level of the cell voltage were above the predetermined value in step F-13, then the CPU 22 checks the state of the AUTO-loading in step F-15. If the AUTO-loading condition were satisfied, then step F-16 is entered, in which the CPU 22 executes the AUTO-loading. If the AUTO-loading condition were not satisfied, then step F-17 is entered, in which the CPU 22 checks to see if the S1 switch is activated, or not. If the S1 switch were ON, then step F-18 is entered to proceed to the execution of photographing sequence.

The photographic sequence begins with measurement of actual distance and light. Based on the results of measuring these, the CPU 22 computes those photographic conditions including the shutter speed and the position of the focal lens. The position of the focal lens can be shifted in a stepwise range from the first to the 24th step for example. According to the position of the focal lens, the focal lens focuses on the target in a focal range from 18 meters (the first step) to 0.8 meter (the 24th step). The computed position of the focal lens is stored in the "lens step" variable memory. Then, the CPU 22 checks to see if the strobe flash light should be activated, or not. If found necessary, then the strobe light is charged. Next, when the switch S2 is turned ON, the CPU 22 extrudes the focal lens forward according to the lens step value. Then, the film frame is externally exposed by driving the shutter to execute a photographic operation before retracting the focal lens back to the initial position.

Next, the winding system winds up the shot frame in step F-19. The CPU 22 identifies from the tension of the film whether the last frame of the film has been shot, or not, in the ensuing step F-20. If the last frame of the film were already shot, then step F-33 is entered, in which the film is fully rewound into the cartridge. If there were some remaining frames in the film, then the ensuing step F-21 is entered, in which the CPU 22 identifies whether the continuous photographic condition is present, or not. The continuous photographic condition is satisfied while both the snap switch and the switch S2 respectively remain activated. If this condition were satisfied, then the functional mode returns to step F-18 to allow the camera to repeat the shooting and the film winding operation. In other words, while the snap mode is underway, the user can continuously shoot the targets by continuously depressing the shutter release button 8.

On the other hand, if the switch S1 were OFF in step F17, then the CPU 22 checks the state of the zoom switch 51 in step F-22. If the switch S1 were ON, then step F-23 is entered, in which the CPU 22 activates the zoom driver 31 to execute the zooming operation. Detail of the zooming operation is described later on.

If the zoom switch 51 were OFF, then the CPU 22 checks the state of the snap switch in step F-24. If the zoom switch 51 were already ON, then the ensuing step 25 is entered, in which the CPU 22 executes the snap sequence. Concretely, when the user depresses the snap button 13, the snap mode is activated to move the zoom lens 51 to the WIDE terminal and set the focal lens to the pan-focal position corresponding to the 11th step. When the user depresses the snap button 13 once again, the snap mode is released to bring the focal lens back to the initial position.

When step F-26 is entered, the CPU 22 checks the state of the mode switch. If the mode switch were ON, then step F-27 is entered to activate the mode sequence to shift the operating mode of the strobe light or the self timer. If the mode switch were OFF, then step F-28 is entered, in which the CPU 22 checks the state of the main switch. If the main switch were ON, the CPU 22 identifies from the state of the switches of the optional switch group 38 whether test condition is complete, or not. If the test condition were complete, then step F-30 is entered, in which the CPU 22 executes photometric tests and distance-measuring tests based on the available test condition. If the test condition were not prepared, then step F-31 is entered to turn the power OFF.

If the main switch were OFF while step F-28 is underway, then the CPU 22 checks the state of the rewinding switch in step F-32. If the rewinding switch were OFF, then the power is turned OFF in step F-31. If the rewinding switch were turned ON, then step F-33 is entered to rewind the film.

Next referring to FIG. 6, zooming operation embodied by the invention is described below.

When the zoom switch 51 shown in FIG. 3 turns ON, first, the CPU 22 identifies from the up/down flag condition whether the zoom mode is performed in the up direction or in the down direction in the initial step S-1 If the up/down flag designates "0", then the CPU 22 executes the "zoom-up" operation. If the flag designates "1", then the CPU 22 executes the "zoom-down" operation. As is described later on, in process of executing the present zooming sequence, the CPU 22 sets the up/down flag which determines the direction of performing the next movement of the zoom lens.

First, the zoom-up operation is described below. When step S-2 is entered, the CPU 22 identifies the zooming mode from the state of the mode select switch (see FIG. 3). If the zooming mode were on the part of the "quick zooming mode", then the CPU 22 sets the up/down flag to "1" in the following step S-3 so that the "zoom-down" operation can be executed next. If the zooming mode were on the part of the "normal zooming mode", then the CPU 22 does not shift the up/down flag so that the zooming operation can be performed in the identical direction in the following round Next, step S-4 is entered, in which the CPU 22 sets the timer so that it can count up 4 seconds of time. Next, step S-5 is entered, in which the CPU 22 rotates the zoom-up motor 32 in the normal direction to perform the zoom-up operation. When step S-6 is entered, the CPU 22 checks the state of the zooming switch 51. If this switch were ON, then step S-7 is entered, in which the CPU 22 checks the state of the TELE switch 55. If the TELE switch 55 were OFF, then the CPU 22 checks the passage of 4 seconds set by the timer set in the proceeding step S-4. If 4 seconds of time were not yet past, then the functional mode returns to step S-6. In other words, while this loop function is underway, the zoom-up operation continues until the zoom lens arrives at the TELE terminal after activating the zoom switch 51. However, after 4 seconds are past, the loop operation is terminated, and then step S-9 is entered, in which the rotation of the zoom motor 32 is discontinued. When the next step 10 is entered, the timer is reset, and then, the zooming operation returns to the main routine.

When the TELE switch 55 remains activated while step S-7 is underway, in other words, when the zoom lens arrives at the TELE terminal, the CPU 22 sets the up/down flag to "1" in step S-11, and then, the down-zooming operation is executed in the next zooming operation. The arrival of the zoom lens at the TELE terminal may be displayed in the viewfinder by means of the LED 24. Then, step S-12 is entered to reset the 4-second timer. Then, the CPU 22 again checks the state of the TELE switch 55 in step S-13. If the TELE switch 55 were OFF, then step S-14a is entered to rotate the zoom motor in the normal direction for 30 $\mu$seconds so that back-lash can fully be absorbed. If the TELE switch were ON, then step S-14b is entered to rotate the zoom motor counterclockwise for 5 $\mu$ seconds. Next, step S-15 is entered to brake the zoom motor for 60 $\mu$ seconds, and then step 16 is entered to turn the zoom motor 32 OFF. Next, step S-17 is entered to set the timer for counting 500 $\mu$ seconds. Next, step S-18 is entered, in which the CPU 22 checks the state of the zoom switch 51. If the zoom switch 51 were already OFF, then step S-10 is entered to reset the timer, and then the functional mode returns to the execution of the main routine.

If the zoom switch 51 still remains ON, then step S-19 is entered, in which the CPU 22 checks the state of the timer counting 500 $\mu$ seconds. If 500 $\mu$ seconds were already past, then step S-20 is entered to reset the timer, and then the functional mode returns to step 1. The resumption of step S-1 is taken into consideration on the assumption that the camera operator may keep on depressing the zoom switch even when the zoom lens already arrives at either the TELE terminal or at the WIDE terminal. In this event, the functional mode does not return to the main routine, but instead, it immediately returns to the initial step of the zoom sequence to allow the camera to instantaneously continue the zooming operation.

The above description has fully referred to the zoom-up operation of the camera embodied by the invention. However, except for the difference in the direction of the movement of the zoom lens, substantially, the zoom-down operation is identical to the zoom-up operation. Concretely, if the up/down flag designates "1" in the initial step S-1, then the CPU 22 identifies the zoom operating mode from the state of the mode select switch 52 while step S-21 is underway. If the CPU 22 identifies that the "quick zooming mode" is activated, then the CPU 22 sets the up/down flag to "0" so that the zoom-up operation can be performed in the next round. If the normal mode were activated, then the CPU 22 does not shift the flag state so that the zooming operation can be performed in the identical direction in the next round. Next, the CPU 22 activates the timer to count up 4 seconds in step S-23. Then, step S-24 is entered to reverse the rotation of the zoom motor 32 so that the zoom-down operation can be executed. Next, step S-25 is entered, in which the CPU 22 checks the state of the zoom switch 51. If the zoom switch 51 were ON, then the CPU 22 checks the state of the WIDE switch 54 in step S-26. If the WIDE switch were OFF, then step S-27 is entered, in which the CPU 22 checks the passage of 4 seconds of time being counted by the timer in the proceeding step S-23. If 4 seconds were not yet counted up, then the functional mode returns to step S-25. Concretely, while this loop operation is underway, the zoom-down operation continues until the zoom lens arrives at the WIDE terminal after activating the zoom switch 51. However, after the counted 4 seconds are past, the loop operation is discontinued, and then step S-9 is entered, in which the rotation of the zoom motor 32 is discontinued. When the next step S-10 is entered, the timer is reset, and then, the functional mode returns to the main routine.

When the WIDE switch 54 remains activated while step S-26 is underway, in other words, when the zoom lens arrives at the WIDE terminal, the CPU 22 sets the up/down flag to "0" in step S-11, and then the up-zooming operation is executed in the next zooming operation. The arrival of the zoom lens at the WIDE terminal may be displayed in the viewfinder by means of the LED 24. Those zooming operations ranging from step S-12 to step S-20 mentioned above for the zoom-down operation are identical to those of the zoom-up operation.

It is also possible for manufacturers to install the mode select switch 52 inside of the camera housing during manufacturing process so that either the normal zooming mode or the quick zooming mode can selectively be provided. The embodiment of the invention may also provide convenience for the user so that he can operate the mode select switch 52 as desired. By providing such a convenience, the user can optionally select either of these zoom-operating modes. For example, the normal zooming mode is quite convenient for such a user who merely desires switching between the TELE and WIDE modes. On the other hand, such a user who is critical about the framing work can quickly gain access to the desired shooting range by focusing on the target with the quick zooming mode.

The above description of the embodiment of the invention has explained the system of the normal zooming mode and the quick zooming mode related to the zooming operation. It is also possible for the invention to introduce modification from and combination of these functional zooming modes. For example, such a mechanism may also be introduced, in which the zoom lens is operated by applying the normal zooming mode until the zoom lens is extruded midway between WIDE position and TELE position, and then the quick zooming mode is applied to the photographic operation. In addition, it is possible for the CPU to properly determine the available zoom mode according to the activated period of the zoom switch 51. For example, the CPU activates the quick zooming mode when the zoom switch 51 remains activated for a short while, and conversely, the CPU activates the normal zooming mode when the zoom switch 51 remains activated for a long while.

Figure 7:
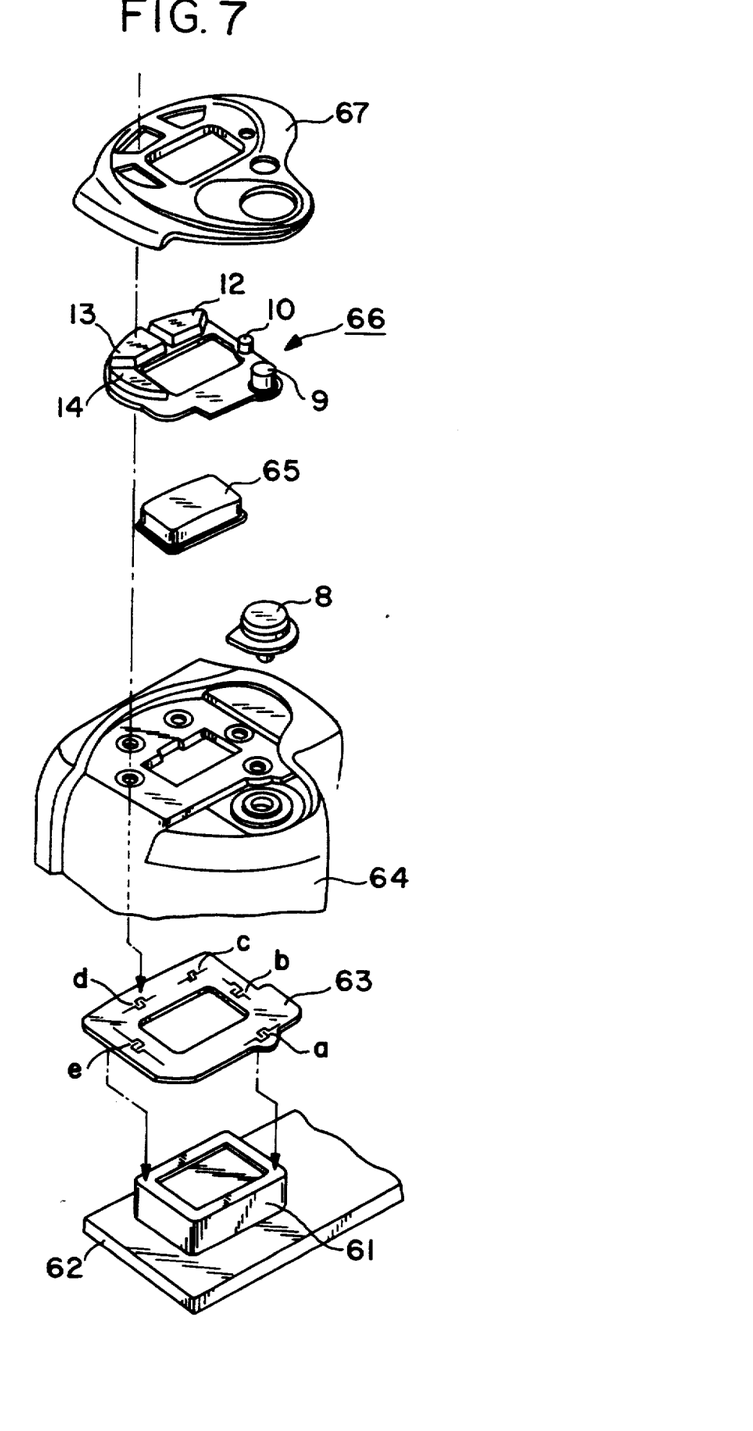
FIG. 7 designates the disassembled components of the LCD panel and the peripheral functional buttons.

FIG. 7 illustrates disassembled component members of the LCD panel and the peripheral functional buttons of the camera according to an embodiment of the invention. An LCD unit 61 is mounted on a main base plate 62. A switch base plate 63 is superposed on the main base plate 62. The switch base plate 63 is superficially provided with a variety of switch patterns "a" through "e" for composing those functional switches including other zoom switch 51. Both the LCD unit 61 and the switch base plate 63 ar fully covered by the camera cover 64. Display panel of the LCD 61 is protected by the LCD window 65.

Reference numeral 66 designates a switch rubber unit, which integrally mounts the zoom button 9, the halfway-film rewinding button 10, the mode switching button 12, the snap mode setting button 13, and the power button 14, respectively. A plurality of contact rods are vertically provided below these switch buttons. The bottom ends of these contact rods are held right above those switching patterns "a" through "e" (provided on the upper surface of the switch base plate 63) through corresponding holes of the camera cover 64. The bottom ends of these contact rods are respectively coated with conductive material. When any of these functional buttons is depressed, the bottom end of the corresponding contact rod comes into contact with any of those patterns "a" through "e" to generate short-circuit between them so that the corresponding switch can be activated. The reference numeral 67 designates a switch cover for securing the switch rubber in position.

As mentioned above, the camera embodied by the invention disposed the functional buttons of the operating unit in the periphery of the LCD panel to allow the camera operator to conveniently operate the camera by way of visually confirming the content of the display. When disposing those functional buttons of the operating unit in the periphery of the LCD panel, any of those conventional cameras secures the LCD panel to the base plate, and yet, provides switch patterns on base plates disposed in the periphery of the LCD-mounted base plate. Any conventional camera turns switches ON and OFF by way of connecting and disconnecting and disconnecting switch patterns via the conductive rubber. However, since contact terminals are disposed in the periphery of display window of the LCD, and yet, since those switches are disposed in the further external positions, any of the conventional cameras could not install a variety of switches in the periphery of the LCD panel in the limitedly available space.

On the other hand, the embodiment of the invention has provided an extremely advantageous structure which allows the those switch patterns "a" through "e" to properly be disposed to the position adjoining the LCD panel 61 as a result of the installation of the switch base plate 63 by superposition on the LCD unit 61. In consequence, a number of functional switches can conveniently be provided in the periphery of the LCD panel.

As is clear from the above description, according to the invention, the camera embodied by the invention can properly drive the zoom lens based on the preset mode in response to the functional operation f a single operating member. Accordingly, the camera operator does not need to move his finger to other positions while operating the zoom lens, and yet, he can freely operate the zoom lens at a stationary finger position. This in turn stabilizes camera-holding posture, and thus, the camera operator can be prevented from manually oscillating the camera, and yet, he cannot be nervous about the finger operation, but instead, he can only mind how he can properly shoot the target. Furthermore, since the embodiment merely provides a single operating switch assembly, the number of component members and the installation space can be minimized, and thus, there is less restraint of layout work related to the design of camera. Furthermore, if the embodiment disposes the zoom mode select switch 52 by way of allowing the camera operator to optionally select the desired zoom mode, he can freely operate the zoom drive system embodied by the invention in accordance with photographic circumferences and his choice, thus offering more convenience and practical utility.

What is claimed is:

1. A camera incorporating a zoom lens comprising;
   an operating member for zooming purpose;
   a drive means for driving said zoom lens; and
   a control means for controlling said drive means;
   wherein said control means controls said drive means in the first driving mode in which said zoom lens is moved in a predetermined direction upon operation of said operating member and is further moved in the same direction upon further operation of said operating member; and inverts moving direction upon arrival either at TELE terminal or at WIDE terminal while moving or in the second driving mode in which said zoom lens is moved in a predetermined direction upon operation of said operating member; and inverts direction of movement upon further operation of said operating member; and inverts moving direction upon arrival either at TELE terminal or at WIDE terminal while moving.

2. The Camera according to claim 1, where said control means is designed to control said drive means in said first and second driving modes, and further comprising a selection means for selecting either of said first and second driving modes.

3. The camera according to claim 2 wherein said selection means in approachable form outside.

4. The camera according to claim 1 wherein said first and second driving modes are switched while said zoom lens is moving.

5. The camera according to claim 1 wherein said first and second driving modes are switched dependent upon operation time of said operating member.

* * * * *